(12) United States Patent
D'Sanson

(10) Patent No.: US 9,409,587 B1
(45) Date of Patent: Aug. 9, 2016

(54) 3 IN 1 LADDER, DOLLY, AND SEATING SYSTEMS

(71) Applicant: Henry Sampiano D'Sanson, Honolulu, HI (US)

(72) Inventor: Henry Sampiano D'Sanson, Honolulu, HI (US)

( * ) Notice: Subject to any disclaimer, the term of this patent is extended or adjusted under 35 U.S.C. 154(b) by 0 days.

(21) Appl. No.: 14/730,944

(22) Filed: Jun. 4, 2015

Related U.S. Application Data

(63) Continuation-in-part of application No. 14/275,781, filed on May 12, 2014, now abandoned.

(60) Provisional application No. 61/823,772, filed on May 15, 2013.

(51) Int. Cl.
| | |
|---|---|
| *E06C 1/39* | (2006.01) |
| *B62B 3/02* | (2006.01) |
| *A47C 13/00* | (2006.01) |
| *E06C 1/397* | (2006.01) |

(52) U.S. Cl.
CPC . *B62B 3/02* (2013.01); *A47C 13/00* (2013.01); *E06C 1/39* (2013.01); *E06C 1/397* (2013.01)

(58) Field of Classification Search
CPC .................................. E06C 1/397; B62B 3/02
See application file for complete search history.

(56) References Cited

U.S. PATENT DOCUMENTS

| | | | | |
|---|---|---|---|---|
| 1,814,960 | A * | 7/1931 | Parry | E06C 1/397 |
| | | | | 182/16 |
| 4,235,449 | A | 11/1980 | Tarran | |
| 4,358,124 | A * | 11/1982 | Geschwender | E06C 1/397 |
| | | | | 280/47.18 |
| 4,494,626 | A | 1/1985 | Ast | |
| 4,768,617 | A * | 9/1988 | Mason | E06C 1/397 |
| | | | | 182/1 |
| 5,937,971 | A * | 8/1999 | Storm | B66B 9/0869 |
| | | | | 187/200 |
| 6,158,749 | A | 12/2000 | Roudebush | |
| 6,880,835 | B2 | 4/2005 | Tornabene | |
| 7,093,840 | B2 | 8/2006 | Lucas | |
| 7,487,859 | B2 | 2/2009 | Wang | |
| 2007/0262567 | A1 * | 11/2007 | Benson | B62B 3/008 |
| | | | | 280/656 |
| 2011/0011674 | A1 * | 1/2011 | Kim | E06C 1/22 |
| | | | | 182/106 |
| 2013/0319794 | A1 * | 12/2013 | Hernandez | E06C 5/02 |
| | | | | 182/107 |
| 2014/0041963 | A1 * | 2/2014 | O'Shea | E06C 1/393 |
| | | | | 182/64.1 |

* cited by examiner

*Primary Examiner* — Alvin Chin-Shue
(74) *Attorney, Agent, or Firm* — RG Patent Consulting, LLC; Rachel Gilboy

(57) ABSTRACT

The 3 in 1 ladder, dolly, and seating system is a portable, device that can function as a set of stairs, a ladder, a seating area, and a cargo dolly. It is a four wheeled dolly, or a two-handle hand truck with two wheels in front, and can extend to become a ladder or various types of stairs, including steps for sitting. It is constructed from durable aluminum, or another appropriate material. The device can convert into a set of stairs with removable guardrails, or a smaller set of stairs that can be used as seating with foldable backrests. It can be manufactured with an umbrella holder and an optional canopy tent.

3 Claims, 12 Drawing Sheets

3 IN 1 LADDER, DOLLY, AND SEATING SYSTEMS

CROSS-REFERENCE TO RELATED APPLICATION

The present application is related to and claims priority from prior provisional application Ser. No. 61/823,772, filed May 15, 2013, and non-provisional utility application Ser. No. 14/275,781, filed on May 12$^{th}$, 2014, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of multipurpose apparatuses, and more specifically relates to a 3 in 1 all-purpose cargo handling dolly, step ladder, and viewing chair apparatus.

DESCRIPTION OF THE RELATED ART

When transporting goods for the purpose of storing them in a high location, it can be challenging to bring both the goods and a ladder at the same time. Similarly, painters, masons and other craftsmen and artists may have a hard time transporting materials and working on high walls for extended periods. Additionally, when viewing a parade, game or similar event, people may struggle to find a comfortable spot and a good view. A multipurpose solution is desirable.

Various attempts have been made to solve the above-mentioned problems such as those found in U.S. Pat. No. 6,158,749 to H. Richard Roudebush; U.S. Pat. No. 6,880,835 to Dean Tornabene; U.S. Pat. No. 4,235,449 to Phil K. Tarran; U.S. Pat. No. 4,768,617 to Mason et al; U.S. Pat. No. 4,044,857 to Guerette; U.S. Pat. No. 7,753,169 to Kurtz; and U.S. Pat. No. 5,397,971 to Storm. This art is representative of multipurpose apparatuses. None of the above inventions and patents, taken either singly or in combination, is seen to describe the invention as claimed.

Ideally, a multipurpose apparatus should provide relative ease of use, ease of transport for items desired to be carried, and yet would operate safely, reliably and be manufactured at a modest expense. Thus, a need exists for a reliable 3 in 1 ladder, dolly, and seating system to provide material transportation means, a stepladder when needed for accessing high locations, and a multi-level viewing chair for use at any manner of events, and thus to avoid the above-mentioned problems.

BRIEF SUMMARY OF THE INVENTION

In view of the foregoing disadvantages inherent in the known multipurpose apparatus art, the present invention provides a novel 3 in 1 ladder, dolly, and seating system. The general purpose of the present invention, which will be described subsequently in greater detail is to provide a four wheel hand truck as needed for transportation of cargo, a set of stairs as needed to reach and access high locations, and multi-level stadium style seating for use viewing parades and other events.

A 3 in 1 ladder, dolly, and seating system is disclosed herein, in a preferred embodiment, comprising: a 3 in 1 ladder, dolly, and seating assembly, with an upper frame having a series of rotatable steps, foldable guardrails, a top edge, and a bottom edge. It further comprises a lower frame having a pivot member, a plurality of removable wheels, at least two telescopic extension arms, and an extendable handle. The 3 in 1 ladder, dolly, and seating assembly comprises the upper frame and the lower frame in combination. The upper frame has at least one shade-holding apparatus for use while configured as a seating assembly.

A series of steps are fixably and rotatably attached at even intervals along an inside of the upper frame. The series of rotating steps pivot 90 degrees, lock into place, and have vertical spaces between steps while configured as a ladder. When configured as a seating assembly, it has seating with backrests for comfort of use in certain embodiments. The foldable guardrails are removably attachable to the upper frame along the top edge via pivot anchors, and fold down into a handrail while configured as a seating assembly. The bottom edge of the upper frame is attached to the lower frame via a pivot member. The pivot member is attached to the lower frame and upper frame simultaneously, allowing the upper frame to pivot in an upwardly manner, locking into place when configured as a seating assembly. The extendable handle of the lower frame is used to support the upper frame along a mid range while in a raised position.

At least two telescopic extension arms support the upper frame along the top edge when configured as a ladder. The plurality of removable wheels are attached to the lower frame, allowing the 3 in 1 ladder, dolly, and seating assembly to be transported to a location of use with relative ease. The 3 in 1 ladder, dolly, and seating assembly is able to be configured as a two wheeled dolly or a four wheeled dolly as needed. The series of rotating steps fold down and make a flat planer surface for transporting material, when configured as a four wheeled dolly. The plurality of removable wheels are able to be removed for safety purposes, and allow the 3 in 1 ladder, dolly, and seating assembly to remain stationary while in an in use condition when desired.

At least two telescopic extension arms are attached to the lower frame, and are able to be utilized for support of the upper frame when in an in use condition (for when used as a ladder or seating device. The extendable handle is attached to the lower frame, and useable for controlling movement of the 3 in 1 ladder, dolly, and seating assembly while transporting in a dolly configuration. The extendable handle also extends and locks into place to support the 3 in 1 ladder, dolly, and seating assembly when in an in use condition. The upper frame and lower frame are attached via the pivot member, to allow the upper frame to be pivoted upwardly and locked into place, allowing the 3 in 1 ladder, dolly, and seating assembly to be converted into a ladder, a seating assembly, and alternately (back down) as a dolly as per desired application.

The present invention holds significant improvements and serves as a 3 in 1 ladder, dolly, and seating system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, 3 in 1 ladder, dolly, and seating system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a multipurpose device and more particularly to a versatile 3 in 1 multipurpose apparatus as used to improve the ability of a user to provide material transportation, a step ladder when needed for accessing high locations, and a multi-level viewing chair for use at any manner of events.

Generally speaking, the 3 in 1 ladder, dolly, and seating system is a portable, device that can function as a set of stairs, a ladder, a seating area, and a cargo dolly. The device is a standard wheeled dolly, or a two-handle hand truck with two wheels in front, and can extend to become a ladder or various types of stairs, including steps for sitting. It is constructed from durable aluminum, or another appropriate material. The device can convert into a set of stairs with removable guardrails, or a smaller set of stairs that can be used as seating with foldable backrests. It can be manufactured with an umbrella holder and an optional canopy tent. The device is expandable from 4 to 10 feet, and sizes in between.

Figure 1:
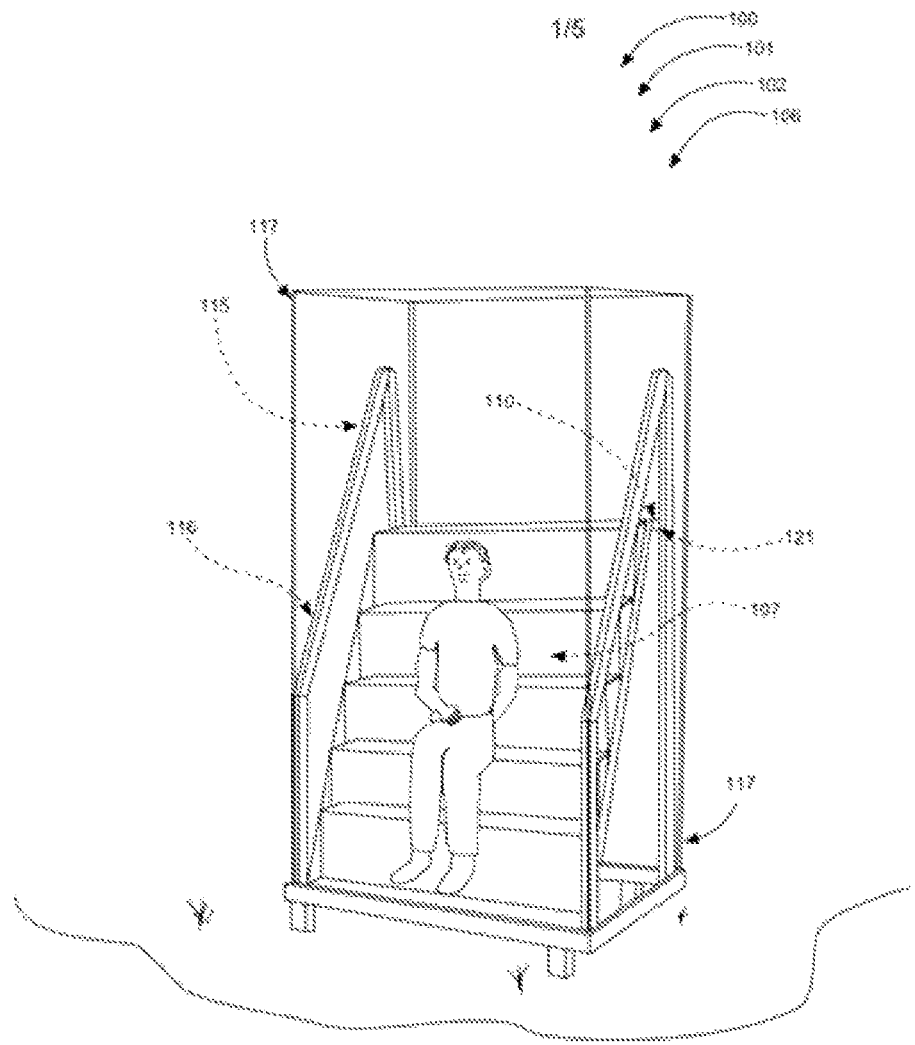
FIG. 1 shows a perspective view illustrating a 3 in 1 ladder, dolly, and seating system in an in-use condition and configured as a seating assembly according to an embodiment of the present invention.

Referring to the drawings by numerals of reference there is shown in FIG. 1, a perspective view illustrating an in-use condition 101 of 3 in 1 ladder, dolly, and seating system 100 configured as seating assembly 106 according to an embodiment of the present invention.

3 in 1 ladder, dolly, and seating system 100 comprises: 3 in 1 ladder, dolly, and seating assembly 102, with upper frame 110 having series of rotatable steps 112, foldable guardrails 115, top edge 120, and bottom edge 124. It further comprises lower frame 132 having pivot member 136, plurality of removable wheels 140, at least two telescopic extension arms 144, and extendable handle 148. 3 in 1 ladder, dolly, and seating assembly 102 comprises upper frame 110 and lower frame 132 in combination. Upper frame 110 has at least one shade-holding apparatus 117 for use while configured as seating assembly 106.

Figure 2:
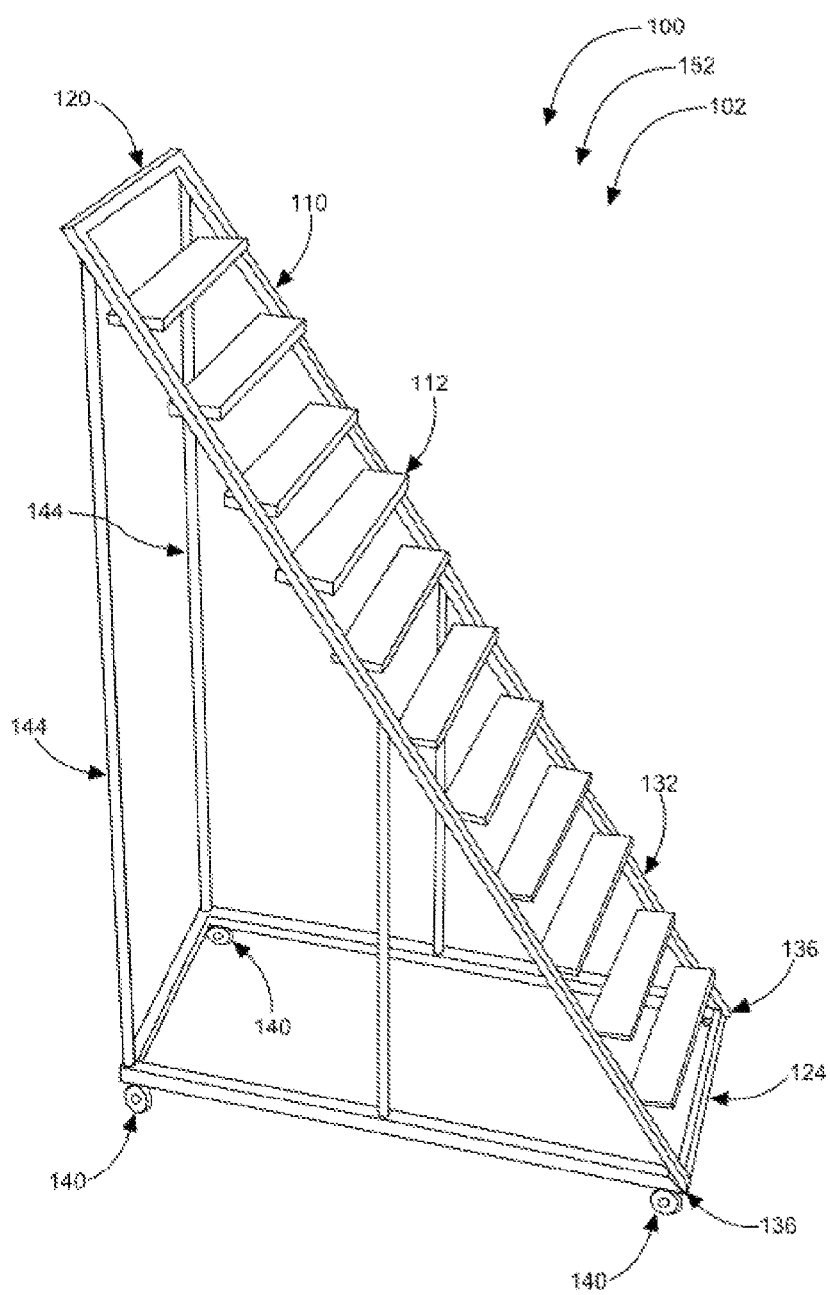
FIG. 2 is a perspective view illustrating a 3 in 1 ladder, dolly, and seating assembly configured as a ladder according to an embodiment of the present invention of FIG. 1.

Referring now to FIG. 2, a perspective view illustrating a 3 in 1 ladder, dolly, and seating assembly 102 configured as ladder 152, according to an embodiment of the present invention.

Series of rotatable steps 112 are fixably and rotatably attached at even intervals along an inside of upper frame 110. Series of rotatable steps 112 pivot 90 degrees, lock into place, and have vertical spaces between steps while configured as ladder 152. When configured as seating assembly 106, it has seating with backrests 107 for comfort of use. Foldable guardrails 115 are removably attached to upper frame 110 along top edge 120 via pivot anchors 121, and fold down into handrail 116 while configured as seating assembly 106. Bottom edge 124 of upper frame 110 is attached to lower frame 132 via pivot member 136. Pivot member 136 is attached to lower frame 132 and upper frame 110 simultaneously, allowing upper frame 110 to pivot in an upwardly manner, locking into place when configured as seating assembly 106. Extendable handle 148 of lower frame 132 is used to support upper frame 110 along a mid range while in a raised position.

Figure 3A:
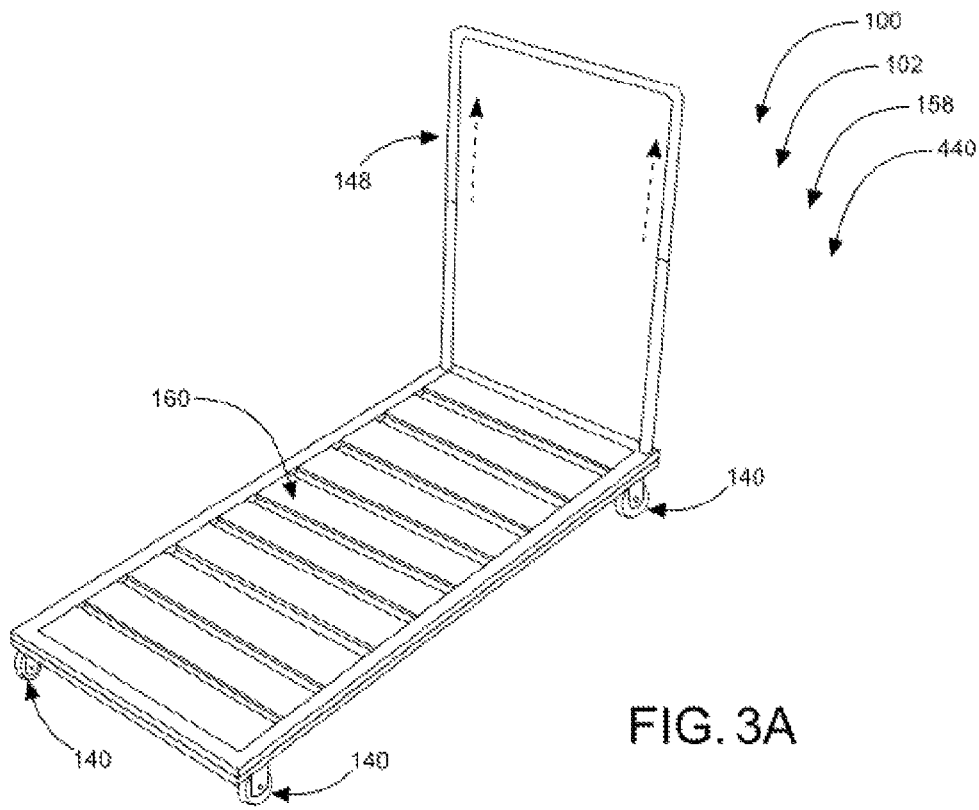
FIG. 3A is a perspective view illustrating a 3 in 1 ladder, dolly, and seating assembly configured as a four wheeled dolly according to an embodiment of the present invention of FIG. 1.
Figure 3B:
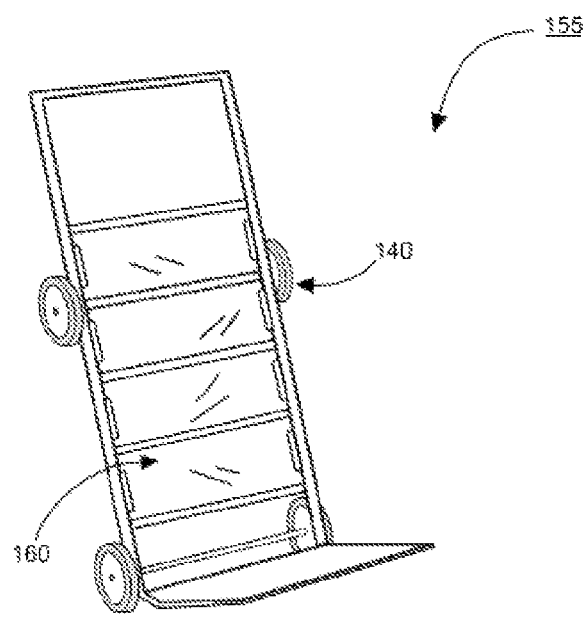
FIG. 3B is a perspective view illustrating a 3 in 1 ladder, dolly, and seating assembly configured as a two wheeled dolly according to an embodiment of the present invention of FIG. 1.

Referring now to FIGS. 3A and 3B, a perspective view illustrating 3 in 1 ladder, dolly, and seating assembly 102 configured as four wheeled dolly 158, and two wheeled dolly 155 respectively, according to an embodiment of the present invention.

At least two telescopic extension arms 144 support upper frame 110 along top edge 120 when configured as ladder 152. Plurality of removable wheels 140 are attached to lower frame 132, allowing 3 in 1 ladder, dolly, and seating assembly 102 to be transported to a location of use with relative ease. 3 in 1 ladder, dolly, and seating assembly 102 is able to be configured as two wheeled dolly 155 or four wheeled dolly 158 as needed. The series of rotatable steps 112 fold down and make flat planer surface 160 for transporting material, when configured as four wheeled dolly 158. Plurality of removable wheels 140 are able to be removed for safety purposes, and allow 3 in 1 ladder, dolly, and seating assembly 102 to remain stationary while in an in use condition 101.

Figure 4:
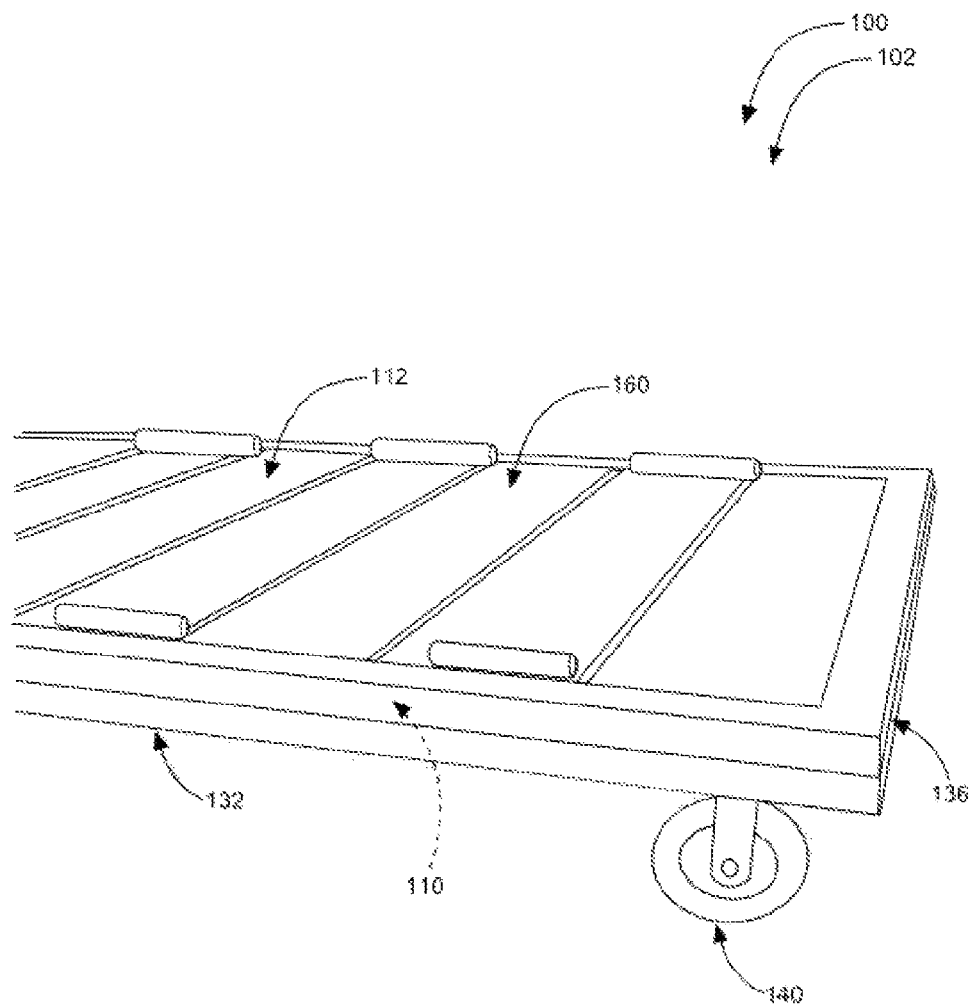
FIG. 4 is a perspective view illustrating a 3 in 1 ladder, dolly, and seating assembly according to an embodiment of the present invention of FIG. 1.

Referring now to FIG. 4, illustrating a perspective view of 3 in 1 ladder, dolly, and seating system 100 according to an embodiment of the present invention.

At least two telescopic extension arms 144 are attached to lower frame 132, and are able to be utilized for support of upper frame 110 when in an in use condition 101. Extendable handle 148 is attached to lower frame 132, and useable for controlling movement of 3 in 1 ladder, dolly, and seating assembly 102 while transporting in a dolly configuration. Extendable handle 148 also extends and locks into place to support 3 in 1 ladder, dolly, and seating assembly 102 when in an in use condition 101. Upper frame 110 and lower frame 132 are attached via pivot member 136, to allow upper frame 110 to be pivoted upwardly and locked into place, allowing 3 in 1 ladder, dolly, and seating assembly 102 to be converted into ladder 152, seating assembly 106, and alternately two wheeled dolly 155 or four wheeled dolly 158 as per desired application. Various components within the present device may telescope as needed.

3 in 1 ladder, dolly, and seating system 100 may be sold as kit 440 comprising the following parts: at least one upper frame; at least one lower frame; at least one series of rotatable steps; at least one plurality of removable wheels; at least two telescopic extension arms; at least one extendable handle; and at least one set of user instructions. 3 in 1 ladder, dolly, and seating system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different telescoping combinations, parts may be sold separately, etc., may be sufficient.

Figure 5:
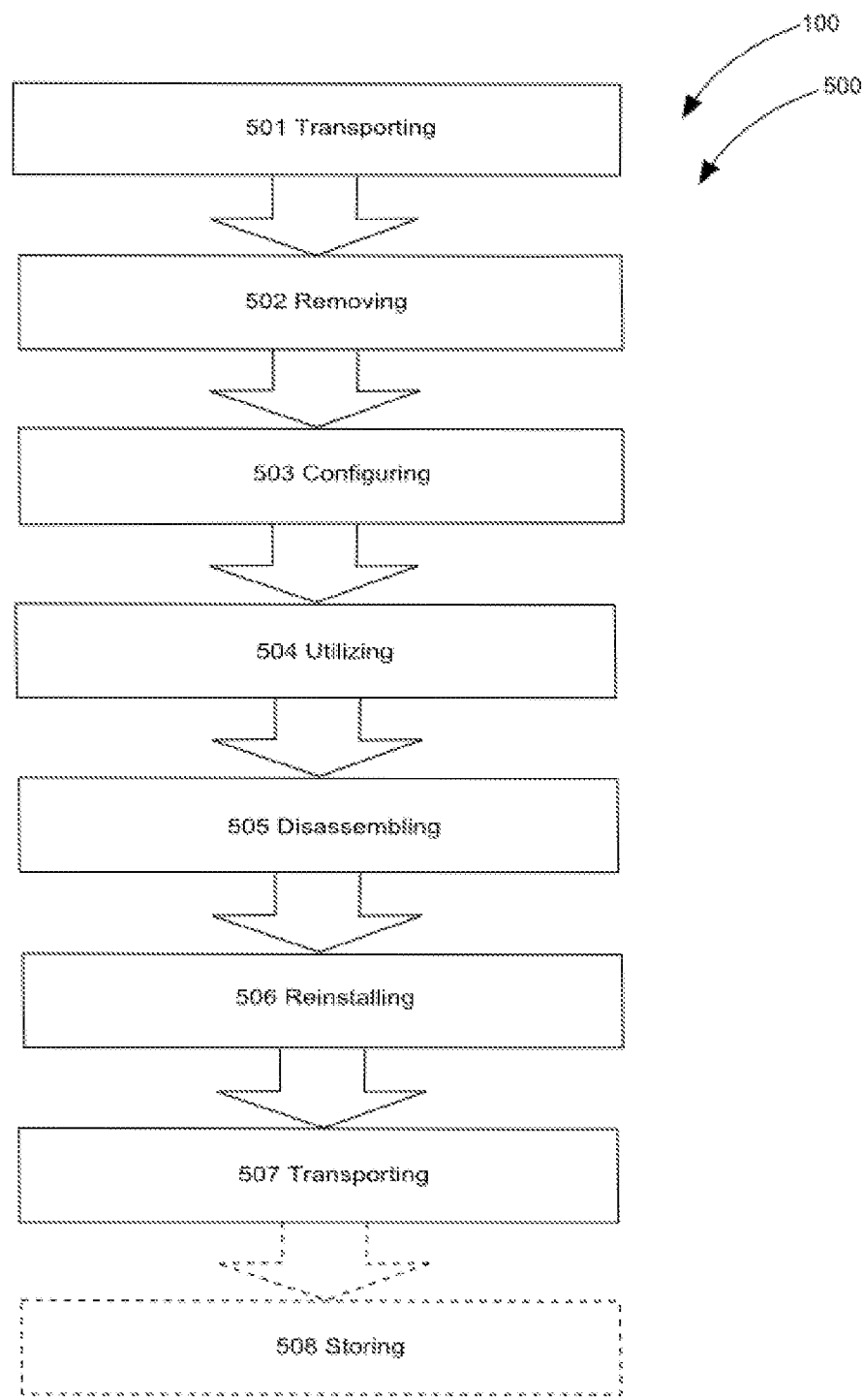
FIG. 5 is a flowchart illustrating a method of use for the 3 in 1 ladder, dolly, and seating system according to an embodiment of the present invention of FIGS. 1-4.

Referring now to FIG. 5, showing a flowchart illustrating method of use 500 for 3 in 1 ladder, dolly, and seating system 100 according to an embodiment of the present invention of FIGS. 1-4.

Step one 501 transporting 3 in 1 ladder, dolly, and seating assembly 102 to a desired location, step two 502 removing plurality of removable wheels 140 for safety, step three 503 configuring 3 in 1 ladder, dolly, and seating assembly 102 as needed for use, step four 504 utilizing 3 in 1 ladder, dolly, and seating assembly 102, step five 505 disassembling 3 in 1 ladder, dolly, and seating assembly 102 for transportation, step six 506 reinstalling plurality of removable wheels 140, step seven 507 transporting 3 in 1 ladder, dolly, and seating assembly to desired location. The method may further comprise step eight 508 storing 3 in 1 ladder, dolly, and seating assembly 102.

It should be noted that step 508 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

Figure 6:
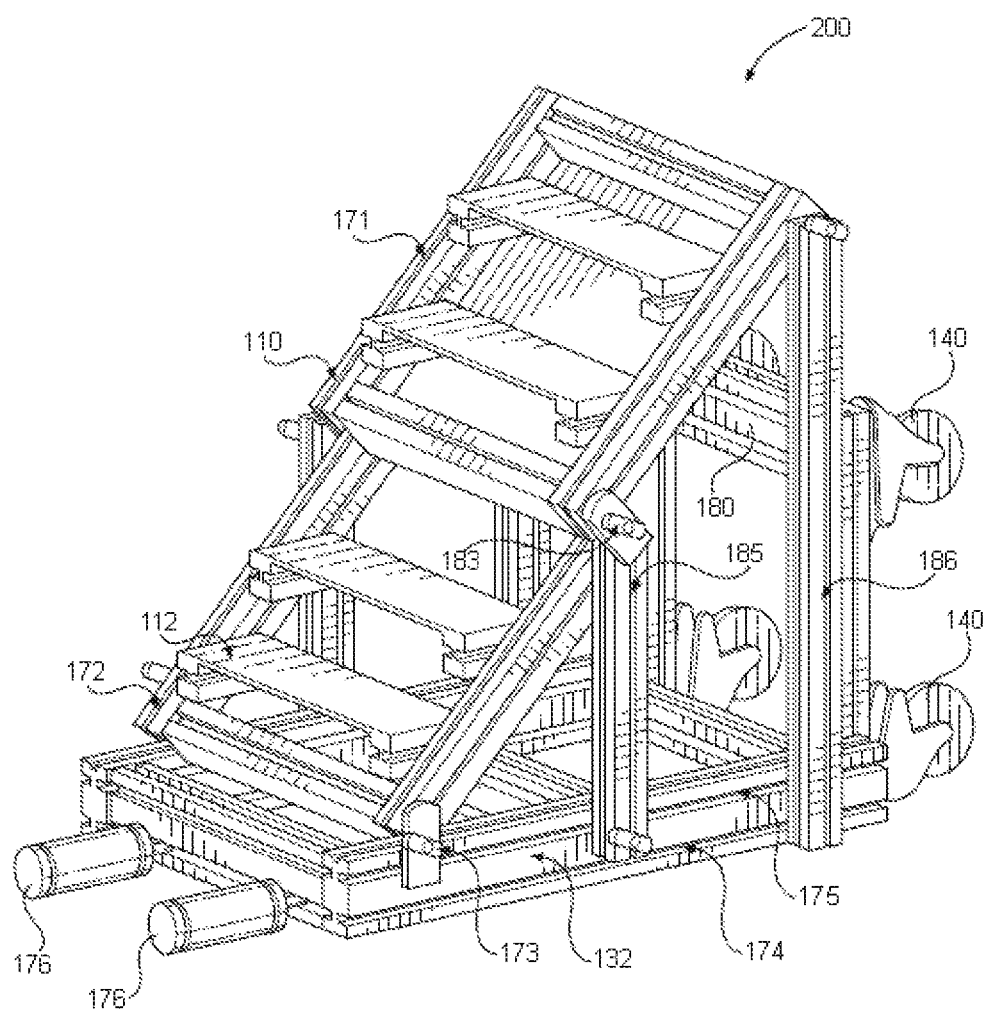
FIG. 6 is a perspective view illustrating a 3 in 1 ladder, dolly, and seating assembly configured as a seating assembly according to an alternate embodiment of the present invention.
Figure 7:
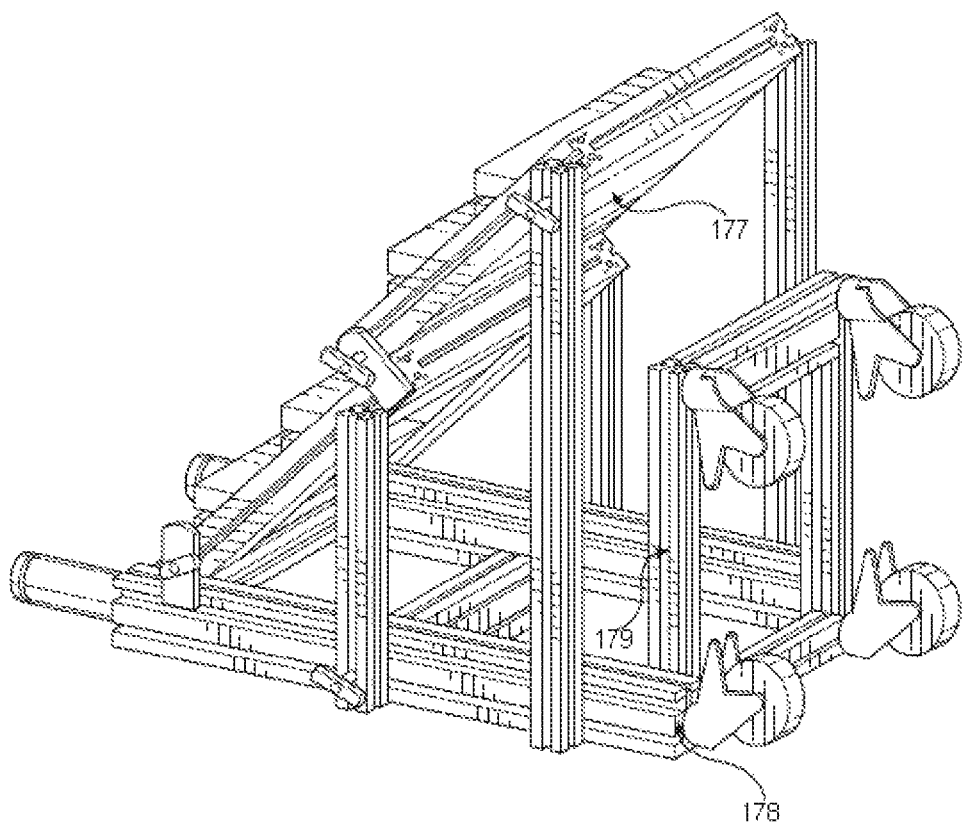
FIG. 7 is a perspective view illustrating a 3 in 1 ladder, dolly, and seating assembly in a folded configuration according to an embodiment of the present invention of FIG. 6.
Figure 8:
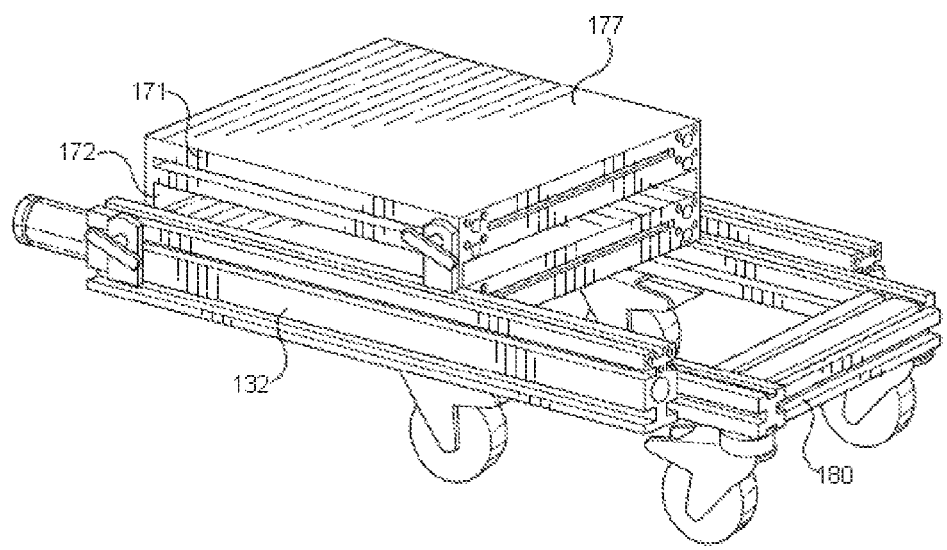
FIGS. 8-11 are perspective views illustrating a 3 in 1 ladder, dolly, and seating assembly in a dolly configuration according to an embodiment of the present invention of FIG. 6.
Figure 9:
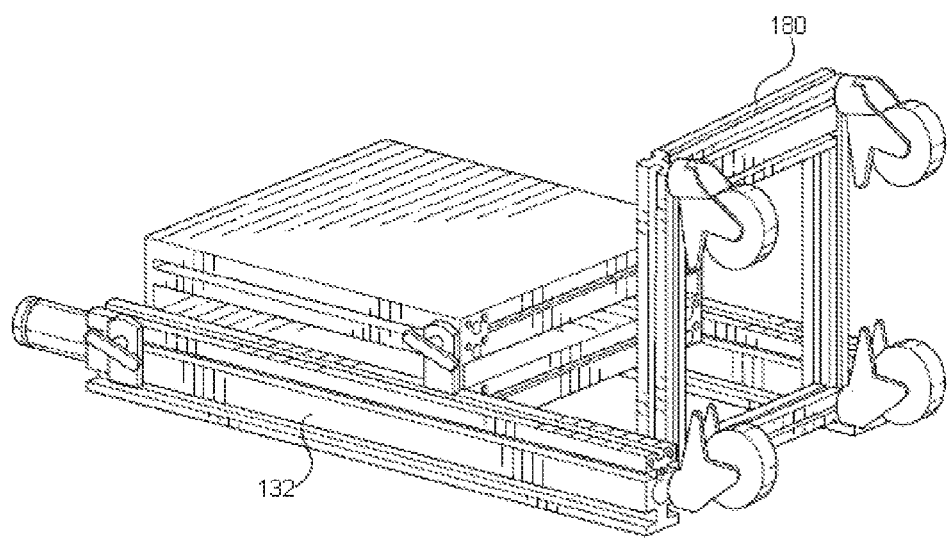
Figure 10:
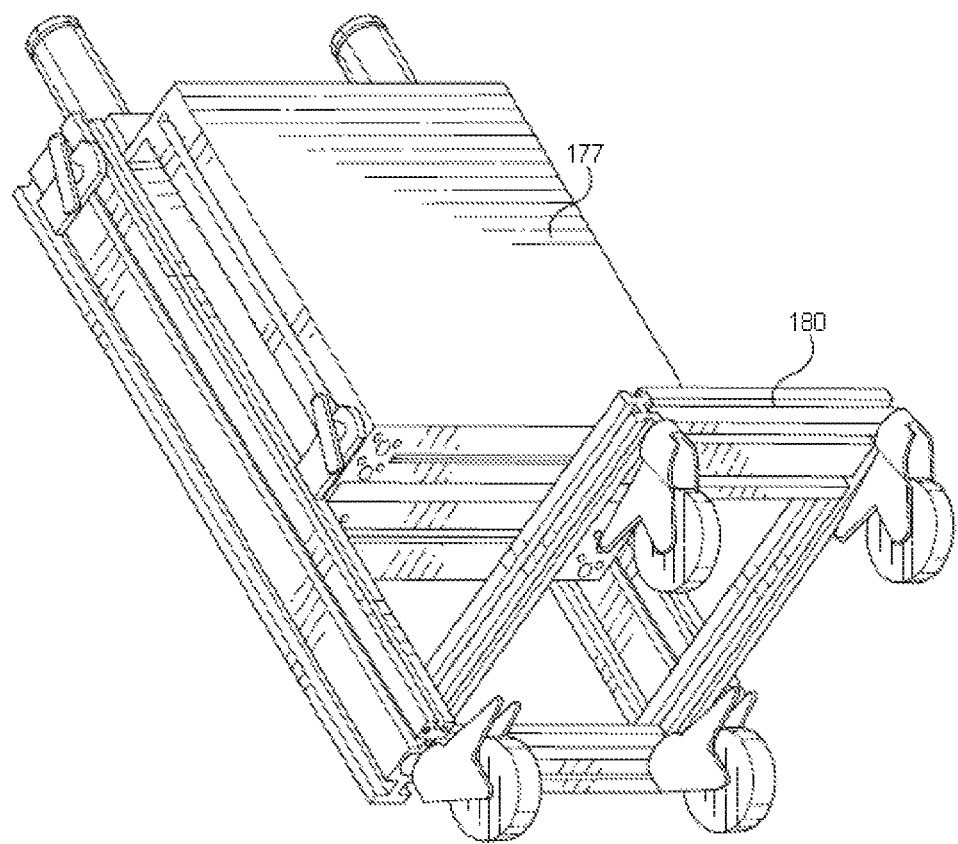
Figure 11:
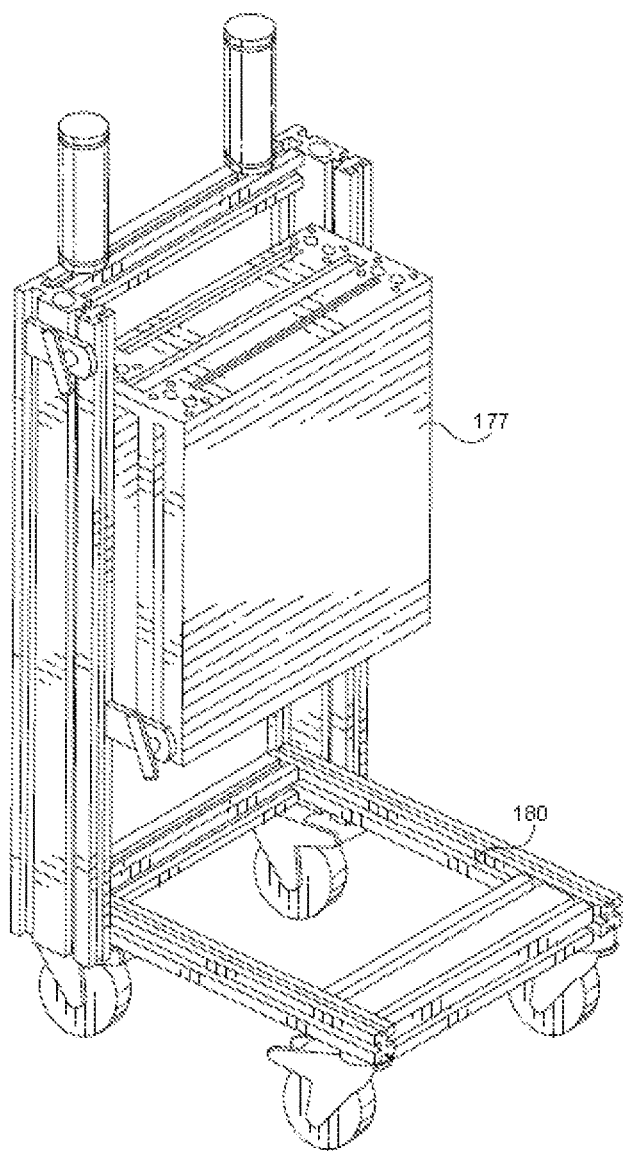
Figure 12:
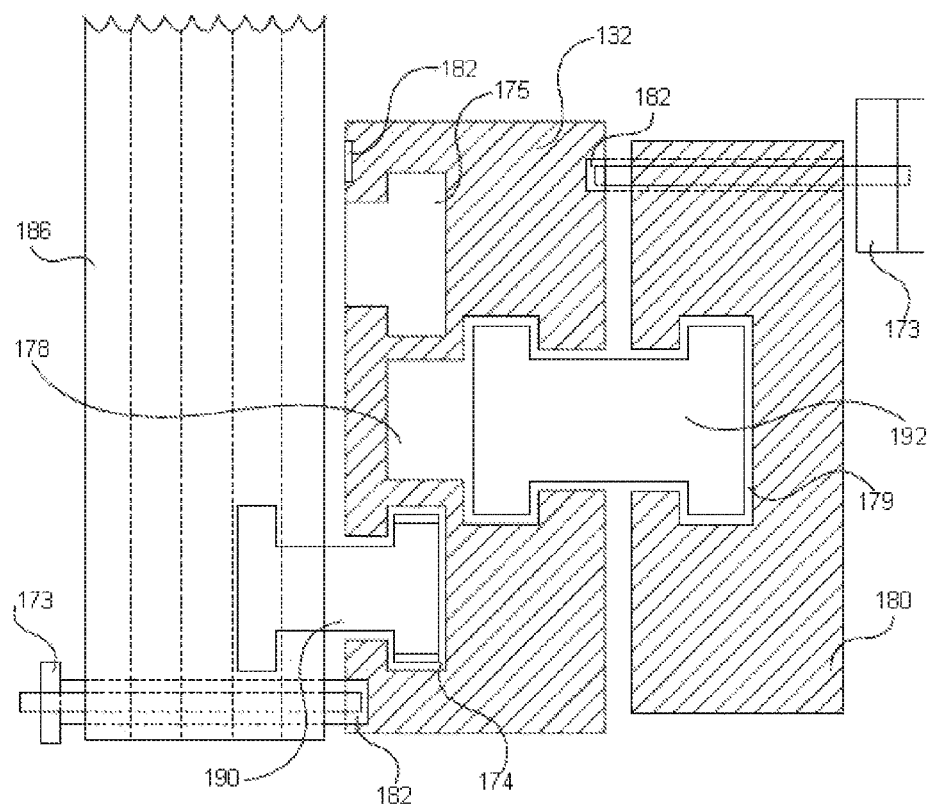
FIG. 12 is a cross-sectional view of an example of the slidable and pivotable connections between frame members and support members via sliding connectors and spring pins.

Referring now to FIG. 6, a perspective view illustrating an alternate embodiment 200 of the 3 in 1 ladder, dolly, and seating assembly. This embodiment comprises an upper frame 110 formed having two rectangular shaped frame sections (171, 172) pivotably connected at adjacent ends via hinge members 183 and spring pins 173, and are foldable upon each other. The upper frame section 171 includes at least two rotatable steps 112 connected thereto as known in the art, and a back panel 177. The lower frame section 172 includes at least two rotatable steps 112 connected thereto as known in the art and is pivotally connected to frame 132 via hinge members 183. In this embodiment, lower frame 132 includes two parallel tracks (174, 175) on opposite exterior sides and extending the length thereof, and tracks 178 located on opposite interior sides and extending the length thereof. A plurality of removable wheels 140 are connected to a wheel frame 180 that has a rectangular shape and is pivotally and slidably connected to lower frame 132 via sliding connector 192 and spring pins 173 (as illustrated in FIG. 12), wherein each opposite exterior sides of the wheel frame have a track 179 extending the length thereof, wherein said wheel frame 180 is adapted to slide within the interior tracks 178 of lower frame 132, such that the wheel frame can be slid within lower frame 132 when in a storage position, as illustrated in FIGS. 6 and 8, and then slid out and pivoted 90 degrees and secured via spring pins 173 and pin holes 182 on the lower frame 132 when in the "dolly configuration" as illustrated in FIGS. 9-11. This embodiment further includes handle members 176 attached to the end portion of lower frame 132 in between the two opposite side portions and are used to pivot and move the apparatus when in the dolly configuration. Support members 185 and 186 are used to support the upper frame 110 in a deployed position when the apparatus is in the "ladder configuration". Support members 185 are pivotally connected to the ends of the side of lower frame section 172 adjacent upper frame section 171 via sliding connector 192, spring pins 173, and pin holes 182, and pivotally and slidably connected to respective tracks 175 of lower frame 132 via sliding connector 192, spring pins 173, and pin holes 182; and support members 186 are removably connected to the ends of the sides of upper frame section 171 opposite the side that is adjacent to lower frame section 172 via spring pins 173, and pin holes 182, and pivotally and slidably connected to respective tracks 174 of lower frame 132 via sliding connector 192, spring pins 173, and pin holes 182 (as illustrated in FIG. 12). The pivotal and slidable connections between the frame members and the support members can also be accomplished by a variety of other known connectors in the art. In this embodiment, the apparatus can be deployed as a ladder that also provides surfaces to sit upon, and when collapsed and folded can be used as a dolly. The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A 3 in 1 ladder, dolly, and seating assembly comprising:
an upper frame including
   a rectangular upper frame section, and
   a rectangular lower frame section,
   wherein said upper frame section and said lower frame section are pivotably connected at adjacent ends and foldable upon each other;
   said upper frame section includes at least two rotatable steps connected thereto, and a back panel;
   said lower frame section includes at least two rotatable steps connected thereto and is pivotally and slidably connected to a lower frame;
said lower frame having a rectangular shape and including
   two parallel exterior tracks located on each opposite exterior side that extend the length of said lower frame, and
   two parallel interior tracks located on each opposite interior side that extend the length of said lower frame;
a wheel frame that has a rectangular shape and including
   two parallel exterior tracks located on each opposite exterior side that extend the length of said wheel frame, and
   wherein said wheel frame is pivotally and slidably connected to said lower frame via a plurality of sliding connectors connected between said interior tracks of said lower frame and said exterior tracks of said wheel frame, and
   a plurality of removable wheels connected to said wheel frame,
   wherein said wheel frame is adapted to be slid within said lower frame when in a storage position, and then slid outwardly and pivoted 90 degrees and secured as such when in a dolly configuration;
a plurality of handle members attached to an end portion of said lower frame in between said two opposite exterior sides of said lower frame,
   wherein said handle members are used to pivot and move said assembly when in a dolly configuration;
a first set of support members adapted to be used to support said upper frame in a deployed position when said assembly is in a ladder configuration, said first set of support members are pivotally connected to end portions of respective sides of said lower frame section adjacent said upper frame section via a sliding connector connected therebetween, and pivotally and slidably connected to respective said opposite exterior tracks of said lower frame via a sliding connector connected therebetween;
and a second set of support members adapted to be removably connected to ends of respective sides of said upper frame section opposite the end that is adjacent to said lower frame section via a sliding connector connected therebetween, and are pivotally and slidably connected to respective said opposite exterior tracks of said lower frame via a sliding connector connected therebetween.

2. The 3 in 1 ladder, dolly, and seating assembly of claim 1 wherein said sliding connectors are formed as cylindrical pins having enlarged circular portions on both ends thereof adapted to fit and move linearly within said tracks of said lower frame, and said wheel frame.

3. The 3 in 1 ladder, dolly, and seating assembly of claim 1 wherein spring pins are used to removably secure said support members to said upper frame and said lower frame, and said wheel frame to said lower frame.

* * * * *